United States Patent [19]
Liao

[11] Patent Number: 5,946,150
[45] Date of Patent: Aug. 31, 1999

[54] TOP MOUNT UNIVERSAL SWIVELING REAR VIEW MIRROR

[76] Inventor: Shidong Liao, 49 Genoa St., Arcadia, Calif. 91006

[21] Appl. No.: 09/189,051

[22] Filed: Nov. 9, 1998

[51] Int. Cl.⁶ ............... G02B 7/182; G02B 5/08
[52] U.S. Cl. ............ 359/871; 359/872; 359/874; 359/875; 248/467
[58] Field of Search .............. 359/871, 872, 359/874, 875, 862, 863, 864, 865, 866, 841, 855; 248/472, 467, 474, 481, 479

[56] References Cited

U.S. PATENT DOCUMENTS

| | | | |
|---|---|---|---|
| 4,196,518 | 4/1980 | Benzaria | 433/60 |
| 4,345,819 | 8/1982 | Villa-Real | 365/189.02 |
| 4,718,756 | 1/1988 | Lancaster | 359/855 |
| 4,767,231 | 8/1988 | Wallis | 403/56 |
| 5,096,283 | 3/1992 | Croteau | 359/865 |
| 5,210,655 | 5/1993 | Mishali | 359/871 |
| 5,342,015 | 8/1994 | Burton et al. | 248/478 |
| 5,546,239 | 8/1996 | Lewis | 359/855 |
| 5,748,395 | 5/1998 | Rendi, Jr. | 359/841 |

*Primary Examiner*—Cassandra Spyrou
*Assistant Examiner*—Mohammad Y. Sikd-er

[57] ABSTRACT

The present invention provides an adhesive attachment of a rigid strip to the top right edge of an existing rearview mirror, the strip attaching to a metal strip ending distally in a knurled ball adapted to be fixingly grasped by a two piece, adjustable socket. The socket is connected to a similar socket fixingly grasping a similar knurled ball extending to another metal strip. The other metal strip attaches to a frame supporting a rearview mirror in a lateral position to the right hand side of the interior rearview mirror.

8 Claims, 4 Drawing Sheets

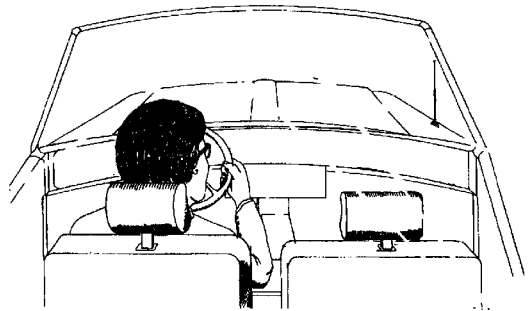
Figure 1 - Prior Art
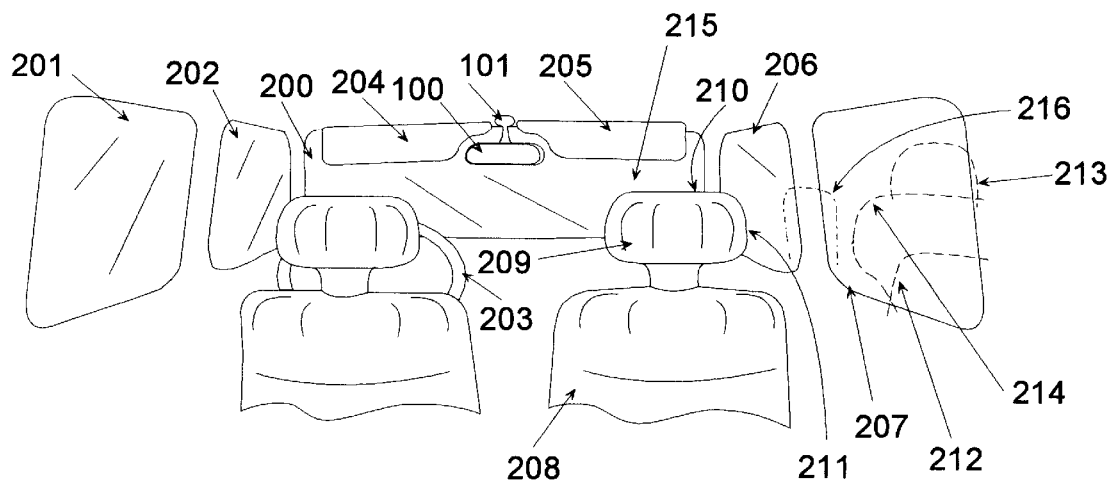
Figure 2

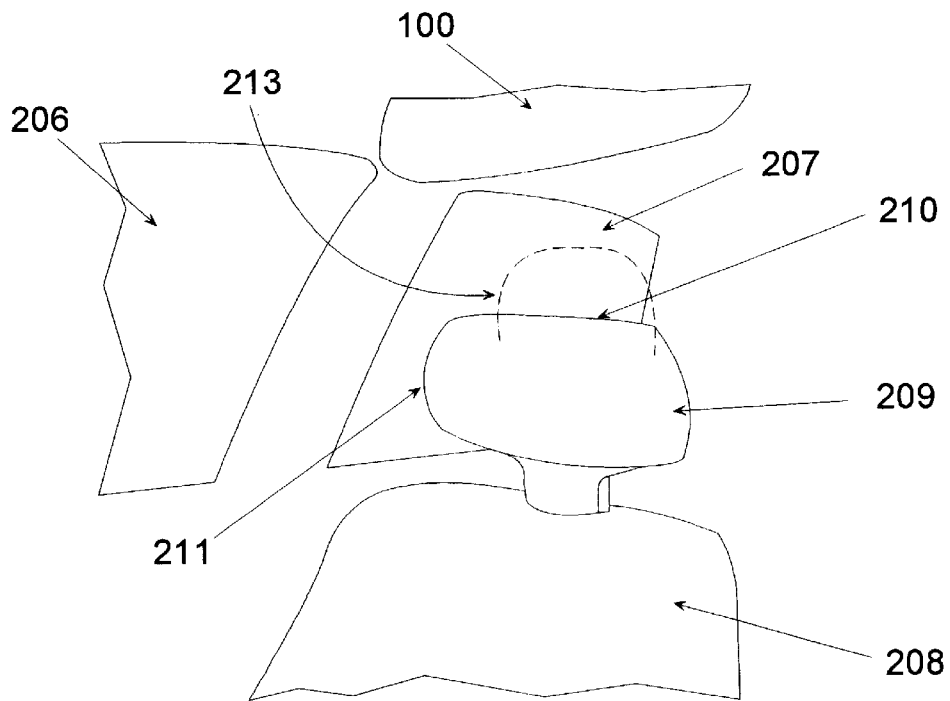
Figure 3 - Prior Art
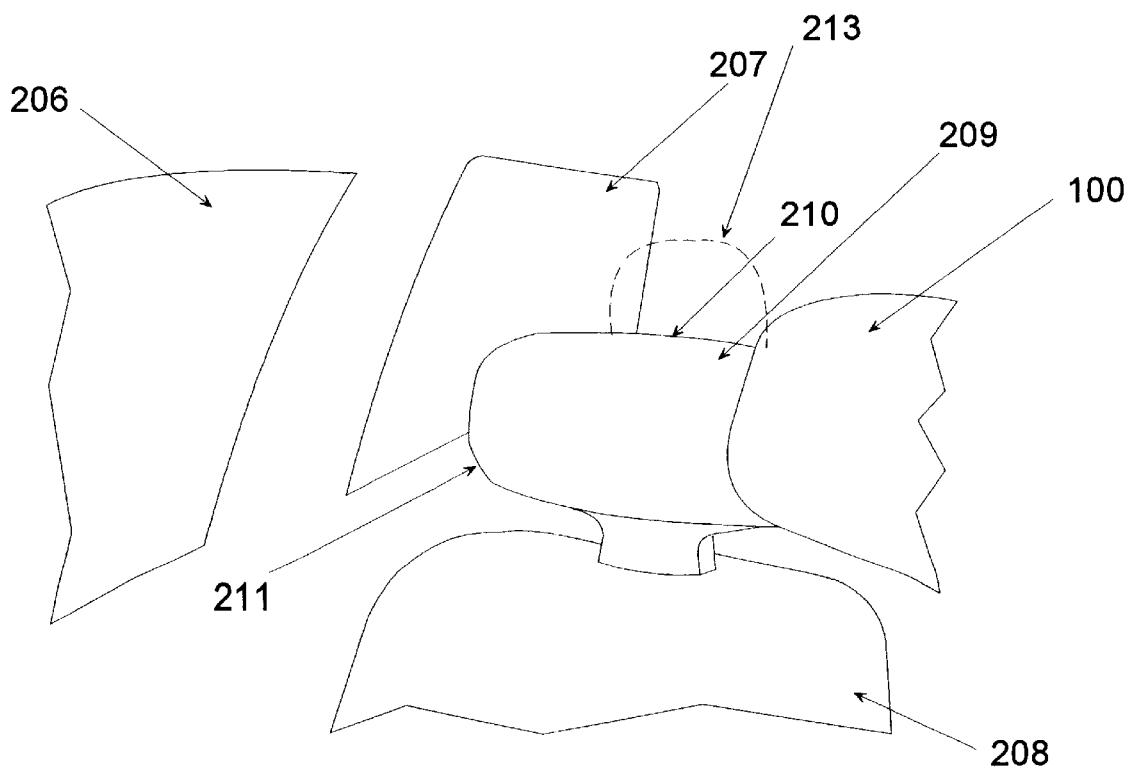
Figure 4

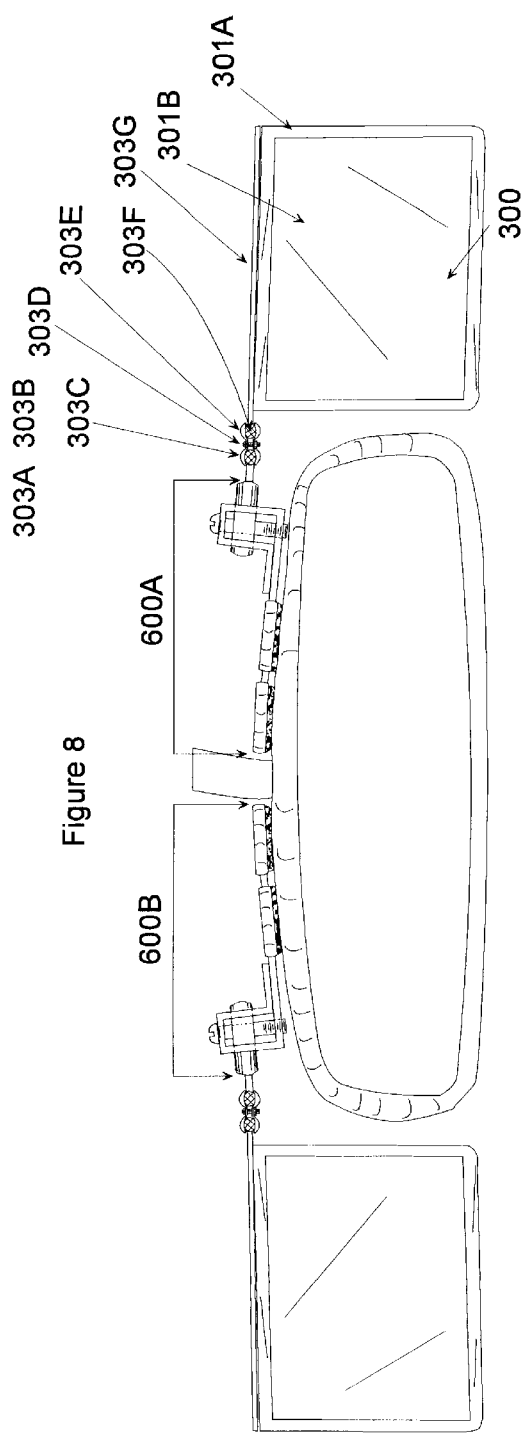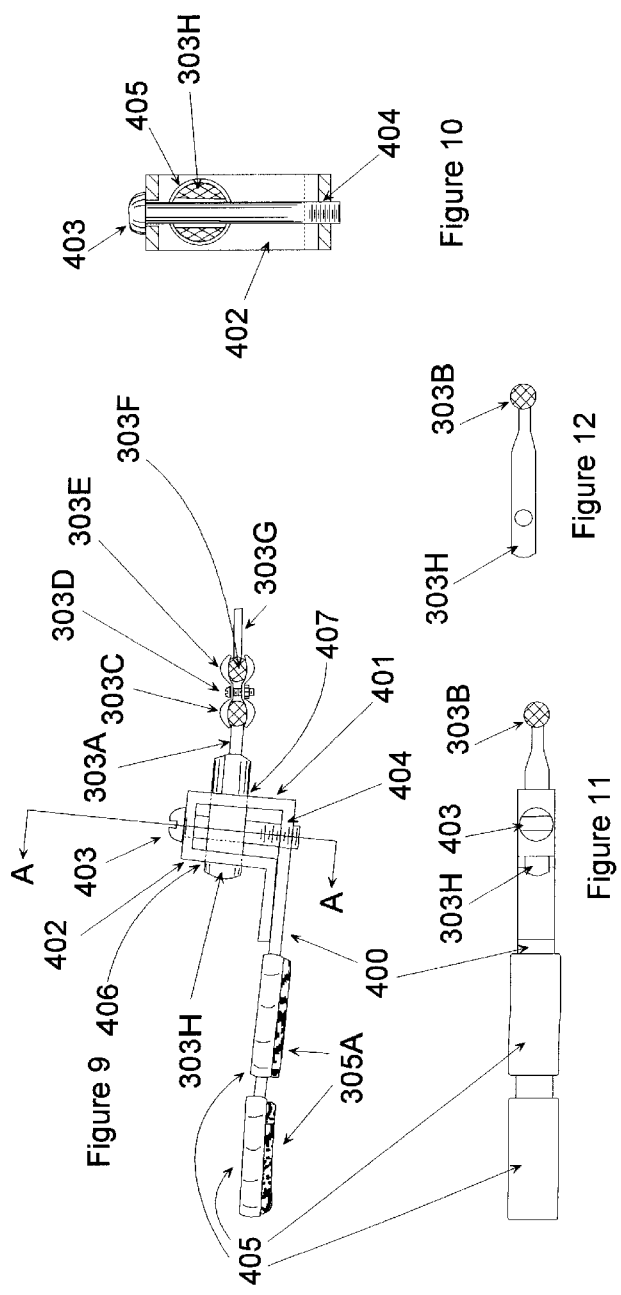

TOP MOUNT UNIVERSAL SWIVELING REAR VIEW MIRROR

BACKGROUND OF THE INVENTION

The present invention relates to rear view mirrors for passenger vehicles and small trucks.

It is well known in the art that the standard, factory supplied rear view mirrors in passenger vehicles, such as cars and small trucks, suffer from a particularly dangerous blind spot, as defined and used herein, in the United States and right hand road driving nations, in the solid angle from about the top to bottom of the right hand rear and passenger windows and extending from the back edge of the right hand passenger window to about a vertical line at about one half to about one third of the length of the right hand front passenger window, that line defined by the edge of the peripheral vision of the driver as the driver looks forward or glances sideways momentarily without significantly turning of the driver's head. The standard rear view mirror is adapted to view only out the back window. The standard exterior right rear view mirror does not, without an image distorting addition, permit the driver to view the blind spot just defined. The view distorting additions are inconvenient and deceptively distort the actual distances and relationships of objects in the blind spot. Most drivers do not rely regularly on the view in such view distorting additions or train themselves with careful inspection how to use such additions.

The prior art shows some attempts to extend the effectiveness of the inside rear view mirror with extensions. These extensions are generally of two distinct types. A first type is easily attachable to an existing interior rearview mirror. A second type requires major structural changes in the primary rearview mirror and necessitates removal and replacement of the factory supplied rearview mirror. The prior art extension devices suffer from a primary defect in present day passenger vehicles. It is well known that the general width of passenger vehicles is shrinking substantially to reduce costs. The prior art devices appear to have intended their greatest benefit in the wider, less crowded interiors of the wider passenger compartments of the vehicles of the 1980's. The present day vehicles, as are experience by many, are relatively narrow and have in the vertical space between the front dash panel and the rear seat either a bench seat or two bucket seats with relatively large headrests. The prior art has not adequately dealt with the reduced size of the passenger compartment and the increased size of the larger headrests in addressing the problem of providing an extension for interior rearview mirrors.

U.S. Pat. No. 5,748,395 describes a dual rearview mirror system with a secondary rearview mirror separately adjustable with respect to a primary rearview mirror and stowable within a housing to which the primary mirror is mounted. The secondary mirror is positioned for viewing a separate field of vision by a deployment mechanism, such as a push-push latching arrangement, which allows the secondary mirror to descend from its stowed position by pushing on an exposed surface while permitting stowage by pushing on that same surface to force the secondary mirror into a cavity within the housing. In the stowed position, the secondary mirror is hidden from sight.

U.S. Pat. No. 4,718,756 describes an adapter for mounting on the interior mirror assembly of a motor vehicle including two mirror segments hinged to each other and engaged at the free ends to the assembly. A cam adjacent the hinge can then be used to set the relative angular alignment between the segments.

U.S. Pat. No. 5,546,239 describes an exterior rearview mirror assembly for a vehicle including an extendable mirror for improved rearward viewing. Several embodiments of the rearview mirror assembly each comprise a mirror housing, a mirror disposed in the mirror housing, and some structure to allow extension of the mirror between an inboard position and an outboard position. In one embodiment, the mirror assembly includes structure to allow rotation of the mirror between inboard and outboard positions. The mirror may comprise a post disposed in a mirror shell and extending along a longitudinal horizontal axis which extends through a plane defined by the mirror, offset from a central vertical axis of the mirror. In another embodiment, the means for rotating the mirror comprises a pivot part having a shaft disposed in an aperture in the mirror shell, which is disposed along the longitudinal horizontal axis. In yet another embodiment, the means for extending the mirror from an inboard position to an outboard position comprises a groove in the mirror housing, in which a mirror frame is slidably disposed. The frame may be slid, relative to the mirror housing, from an inboard position to an outboard position.

U.S. Pat. No. 5,096,283 describes an adjustable rear view mirror extension apparatus that attaches to a standard existing rear view mirror found in most automobiles and other motor vehicles. The apparatus has a mirror, a mirror frame to secure the mirror, a plurality of lateral supports to position the mirror on the frame, and a flexible mirror retainer to releasingly retain the mirror in the mirror frame. There is a mirror frame support that allows the mirror to rotate on a vertical axis and a rotating device to allow the mirror to rotate on a horizontal axis. The rotating device has a housing comprising two sections. The two sections are adjustably connected to adjust the tension of the insert spring which controls the ease of movement of the mirror around its horizontal axis. The rotating device has a first and second surface with a plurality of radial bosses and grooves, respectively, included are an insert, spring and insert gripping device to restrict rotation. There is a bending device such as a flexible metal tubing to selectively position the mirror. The dual pivot device assists the user to move the mirror out of the way of the sun visor of a vehicle. The dual pivot device, also, allows the bending device and therefore the mirror to be adjusted on two more vertical axes. There is an attachment device which has an attachment frame and a plurality of fasteners to attach the apparatus to an existing mirror in the vehicle.

U.S. Pat. No. 4,598,982 describes an extendible mirror bracket housing fastened onto the rear view mirror in the interior of a motor vehicle. The bracket housing slidably carries a bracket within an elongated channel formed in the housing. An extension mirror is pivotably fastened by a hinge to the bracket and may be extracted from the channel. Stop members preclude extraction of the bracket member from the channel. An additional extension mirror may be provided at the rear of the first mentioned extension mirror.

U.S. Pat. No. 4,345,819 describes a centrally placeable multi-angularly manipulatable combination automotive rear view mirror having a plurality of integral flat optically non-distorting reflective faces inter-connected by moveable but firm connecting means; each respective face capable of being positioned optimally by the driver to provide him with a much greater than ordinary scope of vision from both the rear-left side and the rear-right side including the direct rear view of the traffic environment, thus solving the risk factors such as the so-called right-sided rear blind-spot and also diminishing the frequent head turning and common visual disruption to the driver relevant to his important frontal attention during driving. Each corresponding integral face is provided with respective arrow indicia both for instructional purposes to the driver on the proper directional tilt required for each said integral face and also to effectively achieve the functional capability of constantly reminding the driver regarding the proper directional right or left rear view conditions relative to the correspondingly tilted mirror face he is watching.

SUMMARY OF THE INVENTION

The present inventor perceived that the prior art devices lacked an appreciation of the shrinking passenger compartment of a passenger vehicle and the increasing size and increasing height of obstructing padded head rests. The present invention provides a simple retrofit for an existing rearview mirror to reduce to the greatest extent possible these problems in relation to a blind spot viewing mirror while providing an extension that is inexpensive and easily moved during moving of the sunscreen on the passenger's side.

The present invention provides an adhesive attachment of a rigid strip to the top right edge of an existing rearview mirror, the strip attaching to a metal strip ending distally in a knurled ball adapted to be fixingly grasped by a two piece, adjustable socket. The socket is connected to a similar socket fixingly grasping a similar knurled ball extending to another metal strip. The other metal strip attaches to a frame supporting a rearview mirror in a lateral position to the right hand side of the interior rearview mirror.

This extension assembly is at least rotatable forward and backward about an axis generally along the first rigid strip so that the extension mirror can view objects at a different planar angle than the rearview mirror. In addition, the universal swiveling provided by the double ball and joint connection between the extension mirror frame and the rigid strip attaching to the top edge of the rearview mirror allows heretofore unknown viewing of the blind spot. The figures show the dramatic difference in viewing capability between the prior art bottom edge mounted extension mirror and the top edge mounted extension mirror of the present invention.

BRIEF DESCRIPTION OF THE DRAWINGS

FIG. 1 is a view of a prior art conception of the passenger compartment of a passenger vehicle. Note the use of a convertible and the relatively small headrests.

FIG. 2 is a view forward from the rear window of a modern mid-sized passenger vehicle. The headrests are set in the lowest position relative to the top edge of the seat. The roof, doors and metal door posts are eliminated to show just the relationship of the front seats, the front windshield, the front passenger windows and the rear passenger windows.

FIG. 3 is the view for the driver provided by the extension of the prior art extension device in U.S. Pat. No. 5,748,395, showing a portion of the interior rear view mirror in the upper portion of the figure, the back rest and head rest of the passenger seat and the front and rear passenger windows of the view shown in FIG. 2. A broken line shows the top outline generally of the head of a passenger.

FIG. 4 is the view for the driver provided by the extension of the present invention, showing a portion of the interior rear view mirror in the upper portion of the figure, the back rest and head rest of the passenger seat and the front and rear passenger windows of the view shown in FIG. 2. A broken line shows the top outline generally of the head of a passenger.

FIG. 8 is a front view similar to FIG. 5 with an alternate embodiment of the present invention adapted for installation on the right and left sides of an original equipment rearview mirror.

FIG. 9 is a close-up view of the alternate embodiment top-mounting device for the laterally supported extension mirrors.

FIG. 10 is section AA of FIG. 9.

FIG. 11 is a top view of a support rod which is part of the assembly of FIGS. 9 and 10.

FIG. 12 is a top view of the assembly of FIG. 9.

DETAILED DESCRIPTION OF THE INVENTION

Figure 5:
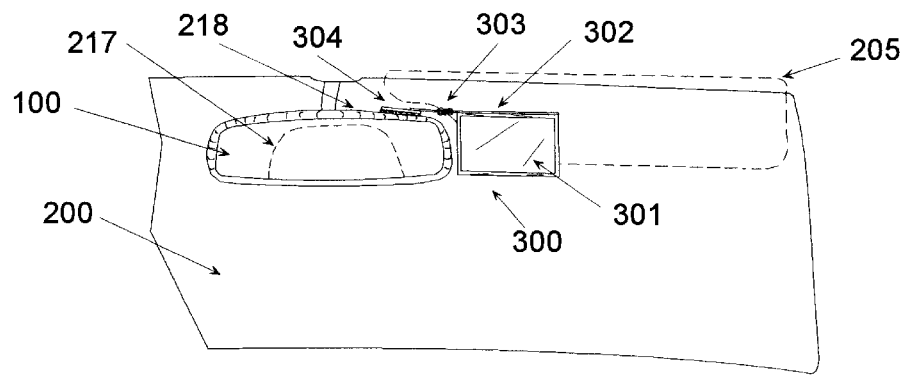
FIG. 5 shows the dual ball jointed mirror extension of the present invention as installed on an existing interior rearview mirror.

The prior art view of FIG. 1 shows the lack of concern with the obstructing effect of the reduced width passenger compartment and the obstructing effects of the headrests. In FIG. 2, a view is shown of a modern, mid-sized passenger vehicle compartment very close in actual perspective and relative size of the objects. Interior rearview mirror 100 is mounted by mount 101 to a roof (not shown). Steering wheel 203 is provided for control of the vehicle and restricts vertical axis rotational motion of the driver's upper torso. Sunscreens 204 and 205 bracket mirror 100 to shield the driver and passenger from sunshine passing though windshield 200. Left and right rear passenger windows, respectively, 201 and 207 are critical to an understanding of the present invention and define a relatively small area when compared with the windows of passenger vehicles of 20 years ago. Right and right front passenger windows, respectively, 202 and 206 are important for the driver to view exterior rearview mirrors. A normal driver's peripheral vision typically allows the driver to see the objects to be viewed through one third to one half of the front width or length of window 206. From that periphery of vision to the back vertical edge of window 207 is generally what will be referred to herein as the blind spot for the driver. Without substantially and significantly turning of the driver's neck and sometimes the upper torso, the objects visible through the windows in the blind spot are generally not visible through any of the rearview mirrors without image distorting or magnifying lensing of the mirrors.

As if the lack of a rearview mirror to view the objects in the blind spot, seat 208 supports head rest 209 with a top edge 210 and a side edge 211, project into the vision of the driver for mirrors attached as extensions to mirror 100 or when the driver turns their torso to the right to look out windows 206 and 207 into the blind spot. Broken line outline 216 generally shows the vision blocking zone of head rest 209 in that act by the driver.

With reference to FIG. 3, the view reflected to a driver in the mirror extension of U.S. Pat. No. 5,748,395 is shown for the passenger compartment of the vehicle in FIG. 2. A broken line outline 213 shows the additional vision obstruction by the head of a passenger. It is quite clear that the bottom mounted extension mirror of U.S. Pat. No. 5,748,395 is almost useless in viewing objects through window 207. The views of FIGS. 2–5 were drawn with reference to overlay of photographs from a modern mid-sized passenger vehicle sold and prepared for operation in the United States. With reference to FIG. 2, broken line outlines 214 and 213 show the general outline of vision obstruction of the head rest 209 and passenger head outline 213 respectively of FIG. 3.

In contrast, with reference to FIG. 4, the view reflected to a driver in the mirror extension of the top mounted swivel mounted extension mirror of the present invention is shown for the passenger compartment of the vehicle in FIG. 2. There is clearly a dramatic reduction in viewable area of window 207. In FIGS. 3 and 4 only a broken away portion of mirror 100 is shown so as to provide reference to the perspective shown. In FIG. 3, the backside of the bottom edge of mirror 100 in shown. In FIG. 4, the backside of the right edge of mirror 100 in shown. In FIG. 2, broken line outline 212 generally shows the outline of obstruction of the head rest 209 for driver's view of the blind spot when the extension mirror of the present invention is installed.

In FIG. 5, mirror 100 is shown with the top mount extension mirror assembly 300 attached by an adhesive strip to the top right edge 218 of mirror 100. Dual ball and socket connector 303 connects a first rigid strip 304 to a second rigid strip 302, whereto is further connected a mirror and frame assembly 301. As described below, assembly 300 permits rigid top mounting attachment of a lateral support for a dual ball and socket connection to the interior rearview mirror, about which connection the extension mirror is rotatable in a three dimensional space about the connector. Also in FIG. 5, the broken line outline 217 of the headrest of the driver is shown, indicating that mirror 100 is not generally parallel with windshield 200 but is angled with the right edge farther away from windshield 200 than the left side and the reflective surface of mirror 100 is generally never vertical, being usually angled slightly downward depending on the driver's height.

Figure 6:
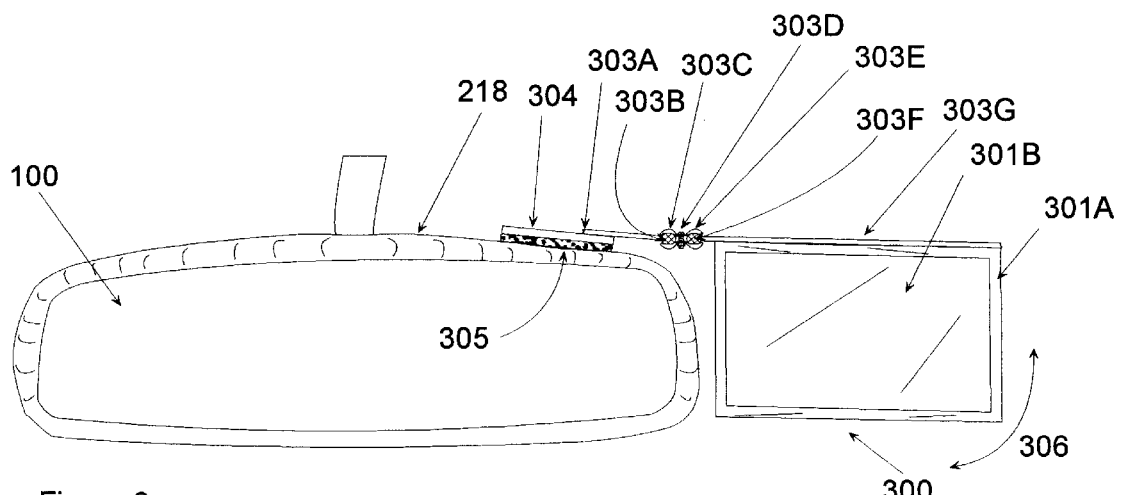
FIG. 6 shows a close-up of the view of FIG. 5.
Figure 7:
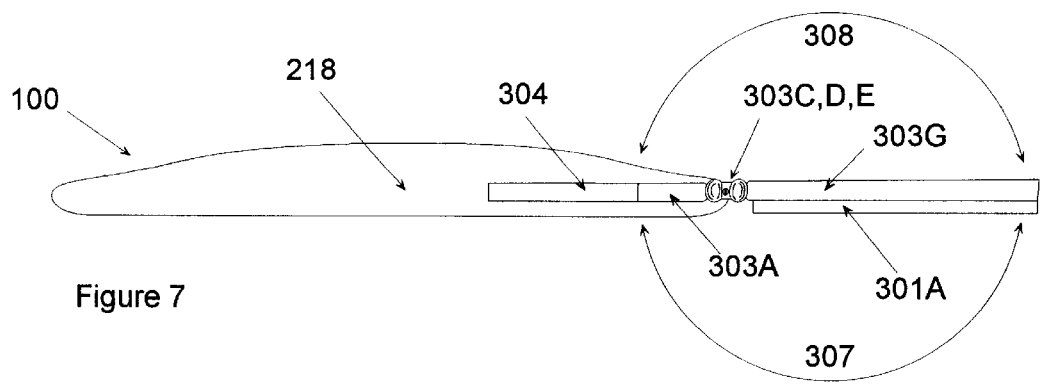
FIG. 7 is a top view of the invention rearview mirror extension of FIG. 6.

FIGS. 6 and 7 show more detailed views of the assembly 300. Preferably, adhesive strip 305 is a piece of deformable polymer foam with a memory about 3–6 inches long, about ¼ to ½ inches wide and less than ⅛ inches thick. Strip 305 is available as a common flexible polymer foam tape with adhesive on both sides for attaching two surfaces together. A bottom side of strip 305 is adhered to edge 218 to secure a top mount for the rest of assembly 300.

First rigid strip 304 is preferably about the dimensions of strip 305. First connector strip 303A is attached by adhesive, welding, soldering or puncturing means such as riveting and bolting to strip 304 to provide rigid attachment of a left side of the connector 300 indirectly to edge 218. Strip 303A extends to a preferably knurled ball 303B which is rotatable by hand pressure although held tightly enough to support in any position the portion of the assembly distal to ball 303B within and between opposing cups 303C according to the pressure controlled by the bolt and nut 303D, which press together a connecting section between opposing cups 303C and 303E. The opposing cups 303C and 303E are joined by the nut and bolt 303D. Knurled ball 303F is held similarly securely within opposing cups 303E as ball 303B is held within opposing cups 303C. Ball 303F extends to second connector strip 303G, which in turn is attached on a bottom side, in a manner similar to that attachment between strips 304 and 303A, to a top edge of mirror frame 301A. Mirror frame 301A holds extension mirror 301B.

A generally horizontal axis lies generally along the length of rigid strip 304. Mirror and frame assembly 301 are rotatable about that axis generally about the axis of the top edge of mirror frame 301A, in the path 306, thus permitting the driver to view objects at a continuously variable range of angles independent of the orientation of mirror 100.

In addition, with reference to FIG. 7, mirror and frame assembly 301 are rotatable about a generally vertical axis initiating at least at about ball 303B, and therefore are capable of rotating along paths 307 and 308. The mirror and frame assembly 301 are rotatable in a manner that permits folding to the front or back of mirror 100. This easy rotation permits the driver or passenger to move the extension mirror to move sunscreen 205 up or down and then rotate mirror and frame assembly 301 back into position. Since the driver is not as constantly viewing the extension mirror as mirror 100, this rotation away and return will not significantly affect the viewing of the blind spot.

It will be appreciated that the mirror and frame assembly 301 may be freely rotated about a three dimensional space generally about ball 303B, limited only by collision of the edges of mirror frame 301A against the interior windshield surface, the left side of the passenger sun screen and the right side of the interior rearview mirror. Obtaining such a dramatic improvement in the viewing of the blind spot in modern passenger vehicles with ease of rotation and orientation is unknown in the prior art.

FIG. 8 shows an alternate embodiment for laterally mounting the dual ball and socket connector to the original equipment rearview mirror shown in FIG. 5. This embodiment is intended to permit easy replacement of the combination of strip 303A and ball 303B if the knurling or friction fit within opposing cups 303C for ball 303B becomes reduced such that effective lateral support for the extension mirror is eliminated. Mounting assemblies 600A and 600B are, respectively, adapted to permit right and left top mounting of the extension mirrors of the present invention for lateral support on an original rearview mirror as a method of retrofitting such rearview mirrors. Assembly 600A is shown in greater detail in FIG. 9.

As shown in FIG. 9, assembly 600A comprises a substantially deformable metal strip 400. Strip 400 is preferably about 2–10 mm wide and about 0.5–2 mm thick and composed of non-spring steel, copper, aluminum or other such metal as may be deformable with hand pressure and yet still capable of supporting the extension mirror of the present invention as described above. Strip 400 is adapted to in an attachment length along the top edge 218, wherealong such attachment length the metal will have been bent or deformed by the installer to fit the many and various shapes of the top edges of original equipment rearview mirrors. About the attachment length of strip 400 are preferably one or more plastic sleeves 405 with a substantial elastic fit around a portion of the attachment length of strip 400. On a bottom surface of sleeves 405 are adhering strips 305A as described above. The sleeve/adhering strip combination is preferred, although not required for all circumstances, for the present embodiment, as the adhesive necessary to bond top edge to the attachment length of strip 400 via strip 305A may be uneconomic in some hot weather locations where a metal to polymer foam adhesion may be difficult to maintain.

Attachment length of strip 401 extends to ascending strip 401, over a screw support section and then to a descending strip 402, which further extends to a "foot" section abutting strip 400 against itself. This "foot" section abutment may be glued, soldered or otherwise connected to the top surface of the attachment length of strip 400 for improved support. Through ascending strip 401 and descending strip 402 are, respectively, aligned holes 407 and 406, adapted to permit easy but supported passage of a cylindrical support piece 303H. One end of support piece 303H is supportively attached or integral with and end of strip 303A so as to support the entire addition dual ball and socket and extension mirror components of the present invention. As shown in FIGS. 9 and 10, support piece 303H is supported within holes 407 and 406 through strips 401 and 402, respectively. Support piece 303H is held in place therein by forming through its shaft a hole through which screw 403 may pass. In securing installation, a threaded end of screw 403 is first passed through a hole in the screw support section of strip 400, through the hole in support piece 303H and then to a threaded hole in the attachment section of strip 400, the threaded hole being aligned with the hole in the screw support section of strip 400, where the threaded end of screw 403 is secured in threaded connection 404. FIGS. 11 and 12 show top views of the objects just described.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:

1. A top mount extension mirror assembly for an interior rearview mirror for a passenger vehicle comprising:

(a) an adhesive strip with adhesive on top and bottom sides, the adhesive strip permanently adhering, on the bottom side, to a top right edge of an interior rearview mirror and, on the top side, to a bottom side of a first rigid strip;

(b) the first rigid strip attached to a first ball which is in turn fixingly engaged in a first socket of a dual ball and socket connector;

(c) a second rigid strip with top and bottom sides, attached to a second ball which is in turn fixingly engaged in a second socket of said dual ball and socket connector, wherein said first and second socket of said dual ball and socket connector jointed by nut and bolt; and (d) a mirror frame with a top edge or back supportively attached to the second rigid strip, the mirror frame supporting an extension mirror adapted within the mirror frame to permit a vehicle driver to view a blind spot for the vehicle without image distortion or magnification.

2. The assembly of claim 1 wherein the mirror frame is adapted to rotate about a vertical axis at about the location of the first ball engagement in the dual ball and socket connector such that the mirror frame is capable of being folded against both a front and back side of the interior rearview mirror.

3. The assembly of claim 1 wherein the mirror frame has a width of about from two inches to four inches.

4. The assembly of claim 2 wherein the mirror frame is adapted to rotate about a vertical axis at about the location of the first ball engagement in the dual ball and socket connector such that the mirror frame is capable of being folded against both a front and back side of the interior rearview mirror.

5. The assembly of claim 1 wherein the mirror frame is adapted to be rotatable in a three dimensional space about the location of the first ball engagement in the dual ball and socket connector limited by edges of the mirror frame striking by an interior windshield surface, a left side of a passenger sun screen and a right side of the interior rearview mirror.

6. The assembly of claim 5 wherein the mirror frame is adapted to be rotatable in an axis generally along an axis of the first rigid strip.

7. A top mount extension mirror assembly for an interior rearview mirror for a passenger vehicle comprising:

(a) an adhesive strip with adhesive on top and bottom sides, the adhesive strip permanently adhering, on the bottom side, to a top right edge of an interior rearview mirror and, on the top side, to a bottom side of an attachment length of a first rigid strip;

(b) the attachment length further comprising a metal strip adapted to be deformable with hand pressure such that the metal strip is generally shapeable to the top edge of an original equipment rearview mirror;

(c) the first rigid strip supportively connected to a first ball which is in turn fixingly engaged in a first socket of a dual ball and socket connector;

(d) a second rigid strip with top and bottom sides, attached to a second ball which is in turn fixingly engaged in a second socket of said dual ball and socket connector, wherein said first and second socket of said dual ball and socket connector jointed by nut and bolt; and (e) a mirror frame with a top edge or back supportively attached to the second rigid strip, the mirror frame supporting an extension mirror adapted within the mirror frame to permit a vehicle driver to view a blind spot for the vehicle without image distortion or magnification.

8. The assembly of claim 7 wherein the supportive connection of the first rigid strip to the first ball comprises means to permit replacement of the first ball upon removal of a screw maintaining a support piece integrally attached to the first ball, whereby the support piece is in supportive alignment with the first rigid strip.

\* \* \* \* \*